Oct. 24, 1944.　　P. C. TEMPLE　　2,360,987
VALVE MECHANISM
Filed April 16, 1941　　4 Sheets-Sheet 1

Inventor
PAUL C. TEMPLE
By Albert G. Bledzki
Attorney

Oct. 24, 1944.   P. C. TEMPLE   2,360,987
VALVE MECHANISM
Filed April 16, 1941   4 Sheets-Sheet 2

Inventor
PAUL C. TEMPLE
By Albert G. Blodgett
Attorney

Oct. 24, 1944.   P. C. TEMPLE   2,360,987
VALVE MECHANISM
Filed April 16, 1941   4 Sheets-Sheet 4

Inventor
PAUL C. TEMPLE
By Albert G. Blodgett
Attorney

Patented Oct. 24, 1944

2,360,987

UNITED STATES PATENT OFFICE 2,360,987

VALVE MECHANISM

Paul C. Temple, Decatur, Ill., assignor to A. W. Cash Company, Decatur, Ill., a corporation of Delaware Application April 16, 1941, Serial No. 388,815

8 Claims. (Cl. 277—24)

This invention relates to valve mechanism, and more particularly to valves adapted to control the operation of hydraulic motors.

Tractors are frequently provided with graders, bulldozers, or snow plows which can be raised and lowered by means of hydraulic motors supplied with fluid under pressure from a suitable pump. Such motors are controlled by manually actuated valve mechanism.

It is one object of the invention to provide a simple, inexpensive, and reliable valve mechanism particularly adapted for controlling a hydraulic motor connected to a bulldozer or the like.

It is a further object of the invention to provide a valve mechanism so constructed and arranged that the hydraulic motor can be held positively in any desired position, while the associated pump is freed from all load.

It is a further object of the invention to provide a valve mechanism so constructed and arranged that the associated bulldozer or the like can be allowed to "float" freely and thereby follow the contour of the ground when desired.

It is a further object of the invention to provide a valve mechanism which will remain substantially in hydraulic balance at all times to facilitate its operation.

It is a further object of the invention to provide a valve mechanism which can be controlled from a remote point through the medium of hydraulic pressure.

With these and other objects in view, as will be apparent to those skilled in the art, the invention resides in the combination of parts set forth in the specification and covered by the claims appended hereto.

Referring to the drawings illustrating one embodiment of the invention, and in which like reference numerals indicate like parts, Fig. 1 is a section through a four-way valve mechanism, shown in its "neutral" position, the section being taken on the line 1—1 of Fig. 2;

Figure 3:
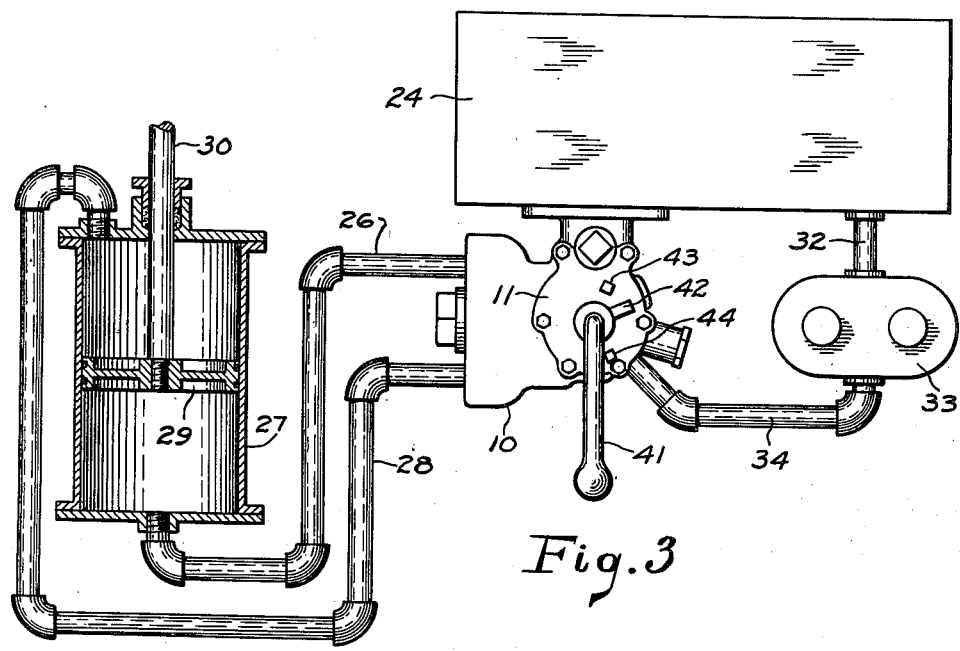
Fig. 3 is an elevation of the valve mechanism with other apparatus connected thereto.
Figure 1:
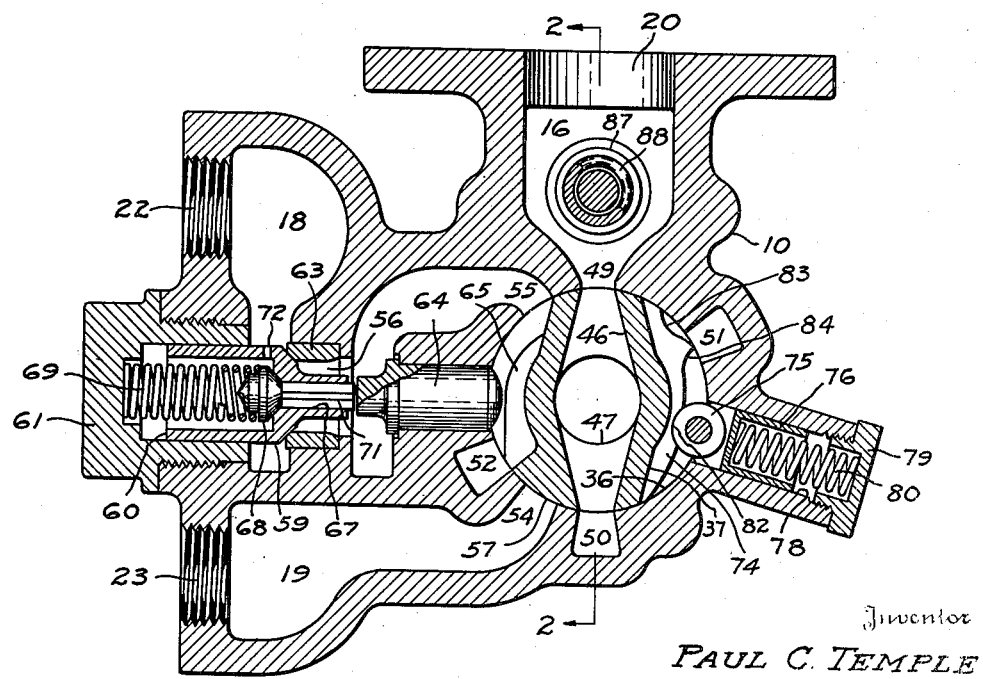
Figure 2:
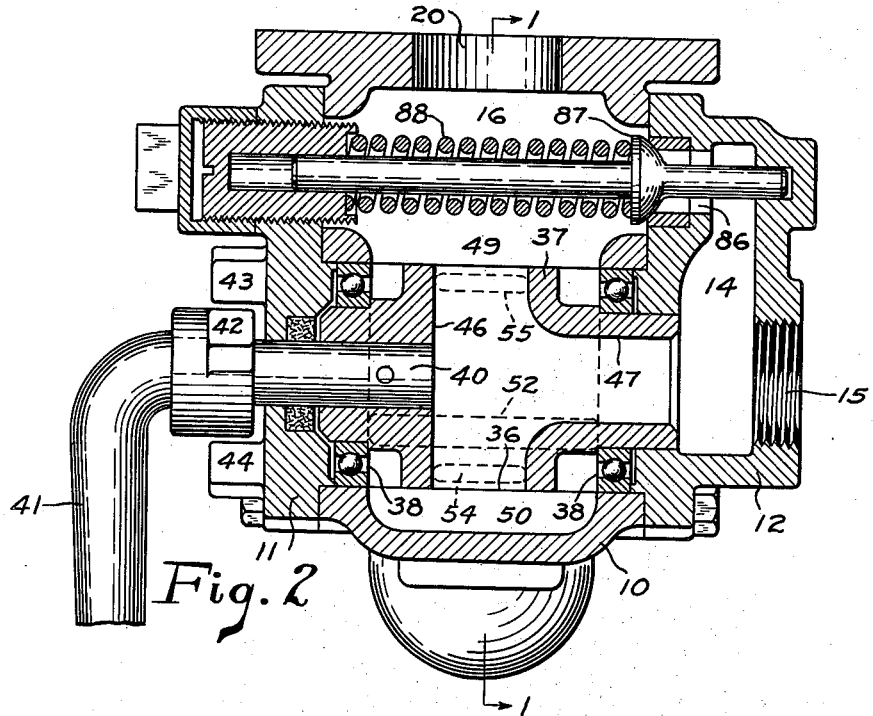
Fig. 2 is a section on the line 2—2 of Fig. 1.

The embodiment illustrated comprises a main body 10 having heads 11 and 12 secured to opposite sides thereof, as shown in Fig. 2, to form a hollow casing. The head 12 is shaped to provide an inlet chamber 14 having an inlet opening 15. The body 10 is shaped to provide an exhaust chamber 16 and two chambers 18 and 19 (Fig. 1). For lack of better terms, the chambers 18 and 19 will be respectively designated as "raise" and "lower" chambers. An exhaust opening 20 leads directly from the exhaust chamber 16, and two openings 22 and 23 communicate directly with the chambers 18 and 19 respectively. As indicated in Fig. 3, the body 10 may be attached to the bottom of a tank or reservoir 24 containing a suitable operating fluid such as oil, the exhaust opening 20 being in direct communication with this tank. The opening 22 is connected by a pipe 26 to the lower end of an upright cylinder 27, and the opening 23 is connected by a pipe 28 to the upper end of this same cylinder. Within the cylinder there is provided a slidable piston 29 having a piston rod 30. Oil is withdrawn from the tank 24 through a pipe 32 by means of a pump 33 and delivered through a pipe 34 to the inlet opening 15. The pump may be driven by any suitable source of power. The entire apparatus may be mounted upon a tractor, and the piston rod 30 may be connected to a bulldozer or the like to raise and lower the same.

Referring now to Figs. 1 and 2, it will be seen that the body 10 is provided with a cylindrical bore 36 to receive a rotary valve 37. The ends of this valve are supported in two ball bearings 38 mounted within the bore 36. A stem 40 extends axially outward from one end of the valve and through the head 11, the outer end of this stem having a handle 41 thereon, so that the valve may be turned about its axis. This handle is provided with a lug 42 which is located between two stops 43 and 44 on the head 11, so arranged as to limit the movements of the valve to approximately ninety degrees. The central portion of the valve is provided with a diametrically extending port 46 which connects with an axial passage 47 leading directly into the inlet chamber 14. In the direction of the port 46 the valve has substantially the same diameter as the bore 36 to form a seal adjacent the ends of this port, but other portions of the valve are spaced from the wall of the bore to allow free circulation of fluid around the valve.

Several ports are provided in the wall of the bore 36. A port 49 connects the exhaust chamber 16 with the bore, and a port 50 is located diametrically opposite the port 49. There are also two diametrically opposite ports 51 and 52 which are circumferentially spaced approximately sixty degrees from the ports 49 and 50 respectively. These four ports are elongated in the axial direction sufficiently to ensure that they will remain in communication around the valve regardless of its position. Between the ports 50 and 52 there is provided a port 54 which leads directly to the "lower" chamber 19. About thirty degrees circumferentially from the port 49, and on the opposite side thereof from the port 51, there is provided a port 55 which is connected with the "raise" chamber 18 by means of a passage 56. These ports 54 and 55 are shorter in the axial direction than the ports 49, 50, 51 and 52, and preferably of substantially the same size as the valve port 46, for reasons which will be made apparent hereinafter. As shown on Fig. 1, the valve 37 is formed with a circumferentially extended portion 57 which overlaps and closes the port 54 when the valve port 46 is aligned with the ports 49 and 50.

The passage 56 has associated therewith a check valve 59 of the poppet type arranged to open in the direction of flow toward the "raise" chamber 18. This valve is formed with a cylindrical sleeve 60 which is slidably supported in a plug 61 screw-threaded in the body 10, and it cooperates with an annular seat member 63 mounted in the passage. The valve 59 is arranged to be opened by means of a plunger 64 aligned therewith and slidably mounted in the body 10, one end of this plunger extending into the bore 36 in position to be engaged by a cam 65 formed on one side of the rotary valve 37. This cam is so shaped that the valve 59 will be open when the rotary valve 37 is turned to either the "lower" position shown in Fig. 5 or the "float" position shown in Fig. 6.

Since the check valve 59 is unbalanced, considerable force would be required to open it directly against a high fluid pressure in the "raise" chamber 18. In order to avoid this difficulty, this valve is formed with a passage 67 of small diameter which extends axially therethrough, the flow through this passage being controlled by a pilot check valve 68 arranged to open in the same direction as the main valve 59. A coiled compression spring 69 urges the pilot valve 68 toward its closed position. The pilot valve is provided with a valve stem 71 which extends through the passage 67, this stem being long enough to be engaged by the plunger 64 slightly before the latter engages the main valve 59. The stem 71 is of non-circular cross-section to avoid complete closure of the passage 67. A small orifice 72 is provided in the sleeve 60 to allow fluid from the chamber 18 to reach the pilot valve 68. Once the pilot valve is opened, fluid may flow through the orifice 72 and passage 67 to reduce the unbalanced load on the main valve and facilitate the opening thereof.

In order to assist the operator in adjusting the rotary valve 37 to desired positions, this valve is provided with an index cam 74 at the side opposite the cam 65. This index cam is engaged by a roller 75 which is mounted on the inner end of a plunger 76, the latter being slidable in a bore 78 formed in the body 10 and extending radially into the main bore 36. The outer end of the radial bore 78 is closed by a screw-threaded plug 79. Between the plug 79 and the plunger 76 there is mounted a coiled compression spring 80 which holds the roller 75 firmly against the cam 74. This cam is provided with a recess 82 in which the roller rests when the valve 37 is in the neutral position shown in Fig. 1, and with a recess 83 in which the roller rests when the valve is in the "float" position shown in Fig. 6. The recess 82 is considerably nearer the axis of the valve than the recess 83. Moreover, the cam surfaces at opposite sides of the recess 82 are inclined inwardly toward the same, so that the pressure of the roller will return the valve to neutral position from either the "raise" position or the "lower" position, upon release of the handle 41. Once the valve is placed in the "float" position, it will be held there until it is turned by means of the handle. Thus it is in only the "raise" and "lower" positions that the operator need retain his grip on the handle. A projecting portion 84 of the cam is so located as to engage the roller when the valve is in the "lower" position (Fig. 5), to assist the operator in placing the valve accurately in this position. It will be noted that the valve is movable in opposite directions through a predetermined range of travel between the "raise" position and the "lower" position. The neutral position of the valve is within this range of travel, while the "float" position is outside the said range. Consequently the valve can be returned to neutral from either the "raise" or the "lower" positions without passing through the "float" position.

Means is preferably provided to relieve any excessively high fluid pressure which may occur in the inlet chamber 14 and thereby protect the pump from overloading. For this purpose the head 12 is shaped to provide a passage 86 (Fig. 2) which connects the chamber 14 with the exhaust chamber 16. The flow through this passage is controlled by a pressure relief valve 87 which opens toward the exhaust chamber, this valve being urged toward its closed position by a coiled compression spring 88.

Figure 4:
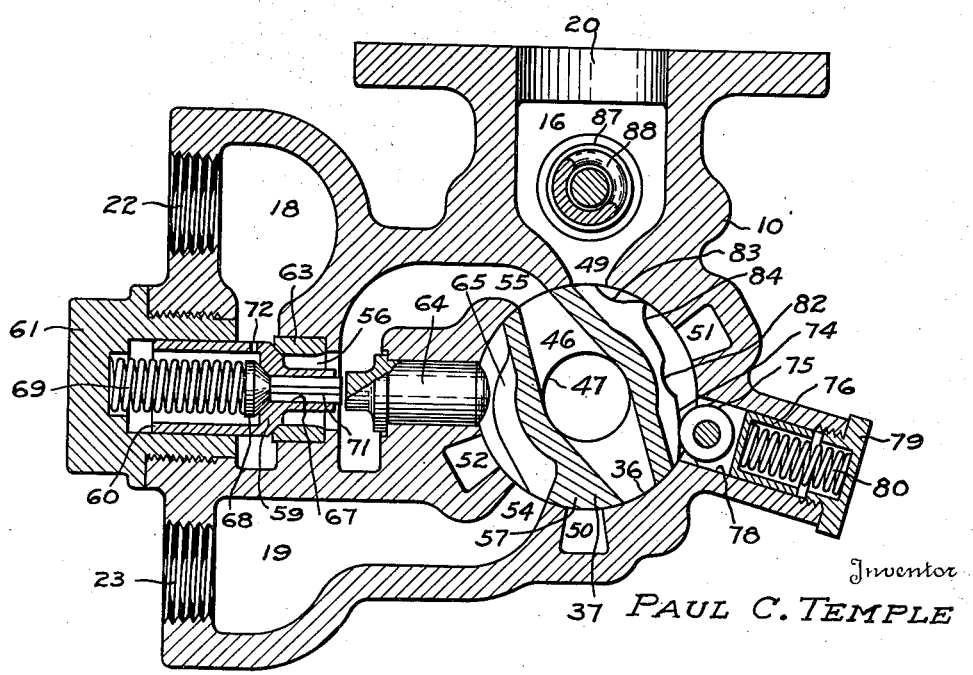
Fig. 4 is a view similar to Fig. 1, showing the valve in its "raise" position.
Figure 5:
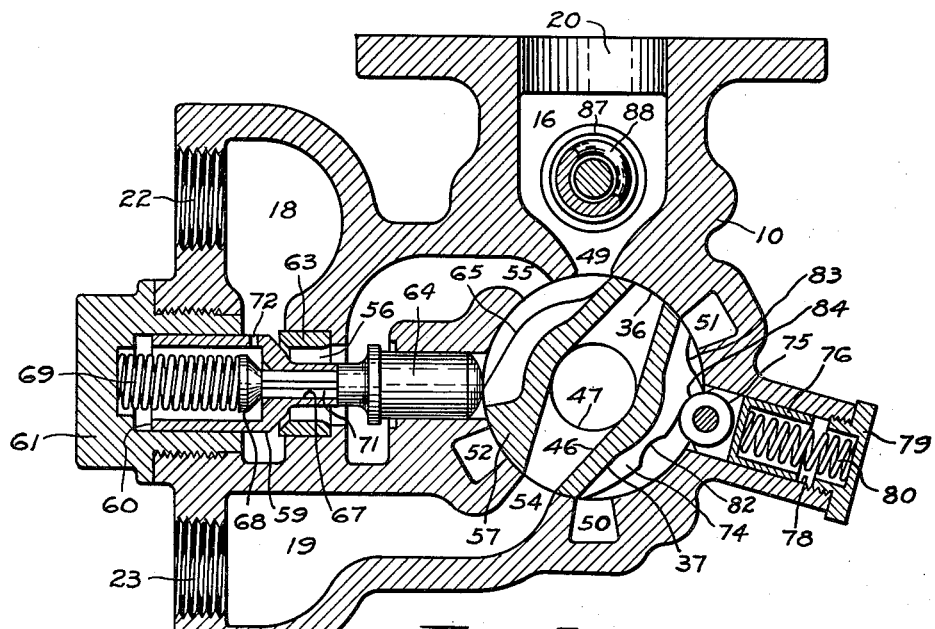
Fig. 5 is a view similar to Fig. 1, showing the valve in its "lower" position.
Figure 6:
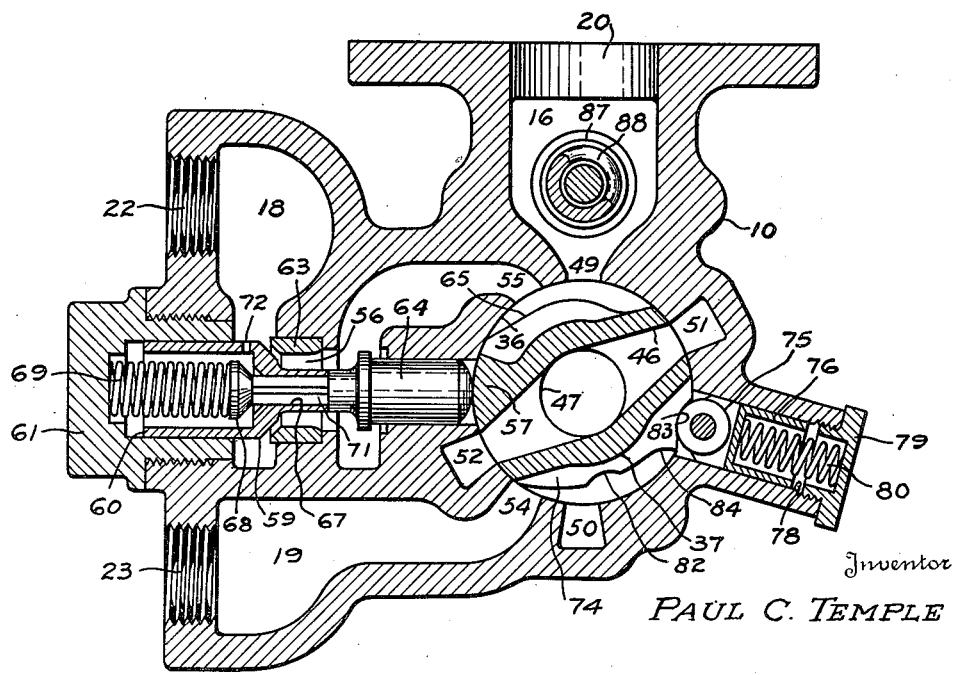
Fig. 6 is a view similar to Fig. 1, showing the valve in its "float" position.

The operation of this embodiment of the invention will now be apparent from the above disclosure. With the valve 37 in its neutral position, as shown in Fig. 1, the oil discharged by the pump will enter the valve ports 47 and 46, and pass freely through the ports 49 and 50 into the exhaust chamber 16, whence it will return to the tank. There will be substantially no load on the pump. If the bulldozer or other device connected to the piston rod 30 is heavy, as is usually the case, the oil in the "raise" chamber 18 will be at high pressure, but leakage of this oil will be prevented by the seating-type valves 59 and 68, which will remain closed. The valve portion 57 will close the port 54 and trap the oil in the "lower" chamber 19, thus preventing any appreciable upward bouncing of the bulldozer. To raise the bulldozer the operator will turn the handle 41 in a counterclockwise direction, as viewed in Fig. 3, until the lug 42 engages the stop 43. This will bring the valve into the "raise" position shown in Fig. 4, with the chamber 19 in communication with the exhaust chamber through the port 54, bore 36 and port 49. The oil supplied by the pump will flow from the port 46 through the port 55 and the passage 56, forcing open the check valve 59, and entering the chamber 18. The oil will travel from this chamber through the pipe 26 to the lower end of the cylinder 27, raising the piston 29 and the bulldozer connected thereto. When the bulldozer reaches the desired position, the operator will release the handle, and the valve will immediately return to the neutral position by reason of the pressure of the roller 75 against the cam 74. To lower the bulldozer, the operator will turn the handle 41 in a clockwise direction until the cam projection 84 engages the roller 75, as shown in Fig. 5. During the initial portion of this movement, the cam 65 will force the plunger 64 outwardly against the valve stem 71, thus opening the small pilot valve 68 and allowing oil to escape from the chamber 18 through the orifice 72 and the passage 67. This will relieve the unbalanced load on the main check valve 59, which can then be readily opened by the continued movement of the rotary valve and the cam 65, thus connecting the "raise" chamber 18 to the exhaust. Oil from the pump will flow through the ports 46 and 54 to the "lower" chamber 19 and thence through the pipe 28 to the upper end of the cylinder 27, causing the piston and the bulldozer to descend. When the desired position is reached, the operator will release the handle, which will return automatically to neutral position. If the operator wishes the bulldozer or other implement to follow the contour of the ground freely, he will turn the handle 41 until the lug 42 engages the stop 44, which will bring the rotary valve into the "float" position shown in Fig. 6, with the cam roller 75 in the recess 83. The check valve 59 will be open, and since both the ports 54 and 55 will be open to the bore 36 there will be no substantial resistance to the up and down movements of the piston 29. Moreover the pump will operate without appreciable pressure, since the port 46 will be registered with the ports 51 and 52 leading to the bore 36 and the exhaust port 49.

Figure 7:
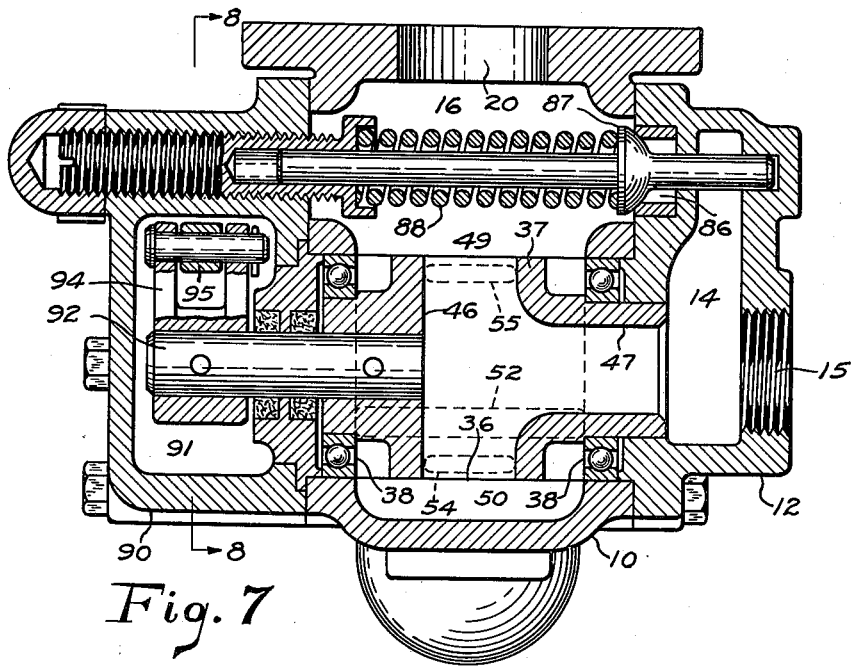
Fig. 7 is a sectional view similar to Fig. 2, but showing the mechanism modified for remote hydraulic control, the section being taken on the line 7—7 of Fig. 8.
Figure 8:
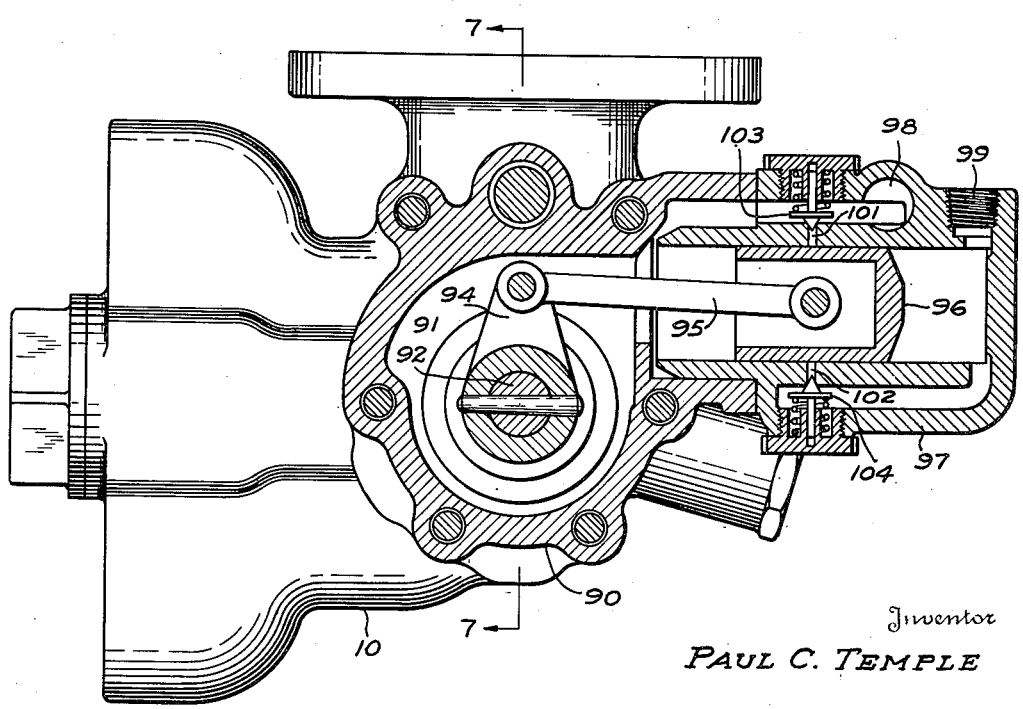
Fig. 8 is a section on the line 8—8 of Fig. 7.

In some cases it may be desirable to operate the valve from a remote control station by hydraulic means. For this purpose the valve mechanism may be constructed as shown in Figs. 7 and 8. In this embodiment the head 11 is replaced by a hollow head 90 having a chamber 91 therein, and the valve stem 40 is replaced by a stem 92 which extends into this chamber 91 and carries an arm 94. This arm is joined by a connecting rod 95 to a piston 96 slidably mounted in a cylinder 97. This cylinder is secured to the head 90, and the inner end of the cylinder communicates directly with the chamber 91. By introducing oil into one end of the cylinder while exhausting oil from the other end, it is possible to move the piston and thus turn the valve 37 into a desired position. Openings 98 and 99 are provided which lead respectively to the inner and outer ends of the cylinder, and these openings can be connected to any suitable hand operated reversible pump (not shown). Preferably two ports 101 and 102 are provided in the wall of the cylinder, these ports being controlled by outwardly opening spring-loaded check valves 103 and 104 respectively. The port 101 serves to establish communication between the openings 98 and 99 when the piston reaches the inner end of its stroke, and the port 102 establishes communication between these openings when the piston reaches the outer end of its stroke. This construction makes it possible to maintain a desired positional relationship between the piston 96 and the hand operated pump despite such oil leakage as may occur past the piston, all as more fully described in my prior application, Serial No. 376,467, filed January 29, 1941. It will be understood that apart from the hydraulic actuation of the rotary valve, the operation of this embodiment will be identical with that of the embodiment shown in Figs. 1 to 6.

It will now be apparent that the invention provides a thoroughly dependable and relatively inexpensive valve mechanism particularly adapted for mounting on a tractor to control the operation of a bulldozer or the like. The rotary valve is substantially balanced hydraulically at all times, and it can be actuated very easily. Because of the index cam the operator will always know the position of the valve. He cannot, through carelessness, leave the valve in the "raise" or "lower" position, since it will return to neutral upon release of the handle. The pump is relieved of substantially all load when the valve is in either neutral or the "float" position.

Having thus described my invention, what I claim as new and desire to secure by Letters Patent is:

1. A valve mechanism comprising a hollow casing shaped to provide an inlet chamber, an exhaust chamber, a "raise" chamber, and a "lower" chamber, and valve means mounted within the casing and movable in opposite directions through a predetermined range of travel between a "raise" position in which the inlet chamber is connected to the "raise" chamber, while the "lower" chamber is connected to the exhaust chamber, and a "lower" position in which the inlet chamber is connected to the "lower" chamber, while the "raise" chamber is connected to the exhaust chamber, the valve means also having a neutral position within the said range of travel and such that flow from the "raise" and "lower" chambers to the exhaust chamber is prevented, while the inlet chamber is connected with the exhaust chamber, a "float" position outside the said range of travel and such that the inlet, "raise," and "lower" chambers are all connected to the exhaust chamber, yieldable means biasing the valve means toward the neutral position from both the "raise" and the "lower" positions, and means to restrain the valve means from movement toward the neutral position when it is in the "float" position.

2. A valve mechanism comprising a hollow casing shaped to provide an inlet chamber, an exhaust chamber, a "raise" chamber, and a "lower" chamber, a main valve mounted within the casing and movable to a neutral position in which the inlet chamber is connected with the exhaust chamber, a "raise" position in which the inlet chamber is connected with the "raise" chamber, while the "lower" chamber is connected with the exhaust chamber, and a "lower" position in which the inlet chamber is connected with the "lower" chamber, means to effect communication between said "raise" chamber and the exhaust chamber when the valve is in either its "lower" position or in its neutral position, a check valve to prevent flow from the "raise" chamber to the exhaust chamber when the main valve is in neutral position, and means to open the check valve automatically when the main valve is moved to the "lower" position.

3. A valve mechanism comprising a hollow casing shaped to provide an inlet chamber, an exhaust chamber, a "raise" chamber, and a "lower" chamber, a main valve mounted within the casing and movable to a neutral position in which the inlet chamber is connected with the exhaust chamber, a "raise" position in which the inlet chamber is connected with the "raise" chamber, while the "lower" chamber is connected with the exhaust chamber, and a "lower" position in which the inlet chamber is connected with the "lower" chamber, means to effect communication between said "raise" chamber and the exhaust chamber when the valve is in either its "lower" position or in its neutral position, a check valve to prevent flow from the "raise" chamber to the exhaust chamber when the main valve is in neutral position, means to open the check valve automatically when the main valve is moved to the "lower" position, and means on the main valve to prevent flow from the "lower" chamber to the exhaust chamber when the main valve is in neutral position.

4. A valve mechanism comprising a hollow casing shaped to provide an inlet chamber, an exhaust chamber, a "raise" chamber, and a "lower" chamber, a main valve mounted within the casing and movable to a neutral position in which the inlet chamber is connected with the exhaust chamber, a "raise" position in which the inlet chamber is connected with the "raise" chamber, while the "lower" chamber is connected with the exhaust chamber, and a "lower" position in which the inlet chamber is connected with the "lower" chamber, means to effect communication between said "raise" chamber and the exhaust chamber when the valve is in either its "lower" position or in its neutral position, a main check valve to prevent flow from the "raise" chamber to the exhaust chamber when the main valve is in neutral position, the main check valve having a passage therethrough, a pilot check valve to prevent flow through the passage, and automatically operable means to open first the pilot check valve and then the main check valve when the main valve is moved from neutral position to the "lower" position.

5. A valve mechanism comprising a hollow casing shaped to provide an inlet chamber, an exhaust chamber, a "raise" chamber, a "lower" chamber, and a bore, ports leading from the bore to the exhaust chamber, the "raise" chamber, and the "lower" chamber respectively, a rotatable main valve mounted in the bore and provided with a diametrically extending port which is connected to the inlet chamber by means of an axially extending passage, the diametrically extending port being adapted to register selectively with the "raise" port when the valve is in its "raise" position, with the "lower" port when the valve is in its "lower" position, and with the exhaust port when the valve is in its neutral position, means to effect communication between said "raise" chamber and the exhaust chamber when the valve is in either its "lower" position or in its neutral position, means to effect communication between said "lower" chamber and the exhaust chamber when the valve is in its "raise" position, a check valve associated with the "raise" port to prevent flow from the "raise" chamber to the bore when the main valve is in its neutral position, and a cam associated with the main valve arranged to open the check valve when the main valve is turned to its "lower" position.

6. A valve mechanism comprising a hollow casing shaped to provide an inlet chamber, an exhaust chamber, a "raise" chamber, a "lower" chamber, and a bore, ports leading from the bore to the exhaust chamber, the "raise" chamber, and the "lower" chamber respectively, a rotatable main valve mounted in the bore and provided with a diametrically extending port which is connected to the inlet chamber by means of an axially extending passage, the diametrically extending port being adapted to register selectively with the "raise" port when the valve is in its "raise" position, with the "lower" port when the valve is in its "lower" position, and with the exhaust port when the valve is in its neutral position, means to effect communication between said "raise" chamber and the exhaust chamber when the valve is in either its "lower" position or in its neutral position, means to effect communication between said "lower" chamber and the exhaust chamber when the valve is in its "raise" position, a check valve associated with the "raise" port to prevent flow from the "raise" chamber to the bore when the main valve is in its neutral position, a cam associated with the main valve arranged to open the check valve when the main valve is turned to its "lower" position, and means on the main valve arranged to close the "lower" port when the main valve is in its neutral position.

7. A valve mechanism comprising a hollow casing shaped to provide an inlet chamber, an exhaust chamber, a "raise" chamber, a "lower" chamber, and a bore, two circumferentially spaced ports leading from the bore to the "raise" chamber and the "lower" chamber respectively, two circumferentially spaced ports leading from the bore to the exhaust chamber, a rotatable main valve mounted in the bore and provided with a diametrically extending port when is connected to the inlet chamber by means of an axially extending passage, the diametrically extend'ng port being adapted to register selectively with the "raise" port when the valve is in its "raise" position, with the "lower" port when the valve is in its "lower" position, with one exhaust port when the valve is in its neutral position, and with the other exhaust port when the valve is in its "float" position, means to effect communication between said "raise" chamber and the exhaust chamber when the valve is in its "lower" position, means to effect communication between said "lower" chamber and the exhaust chamber when the valve is in its "raise" position, means to effect communication between the exhaust chamber and both the "raise" and "lower" chambers when the valve is in its "float" position, a check valve associated with the "raise" port to prevent flow from the "raise" chamber to the bore when the main valve is in its neutral position, a cam associated with the main valve arranged to open the check valve when the main valve is in either its "lower" position or its "float" position, and means on the main valve arranged to close the "lower" port when the main valve is in its neutral position.

8. A valve mechanism comprising a hollow casing shaped to provide an inlet chamber, an exhaust chamber, a "raise" chamber, a "lower" chamber, and a bore, two circumferentially spaced ports leading from the bore to the "raise" chamber and the "lower" chamber respectively, two circumferentially spaced ports leading from the bore to the exhaust chamber, a rotatable main valve mounted in the bore and provided with a diametrically extending port which is connected to the inlet chamber by means of an axially extending passage, the diametrically extending port being adapted to register selectively with the "raise" port when the valve is in its "raise" position, with the "lower" port when the valve is in its "lower" position, with one exhaust port when the valve is in its neutral position, and with the other exhaust port when the valve is in its "float"

position, means to effect communication between said "raise" chamber and the exhaust chamber when the valve is in either its "lower" position or in its neutral position, means to effect communication between said "lower" chamber and the exhaust chamber when the valve is in its "raise" position, means to effect communication between the exhaust chamber and both the "raise" and "lower" chambers when the valve is in its "float" position, a check valve associated with the "raise" port to prevent flow from the "raise" chamber to the bore when the main valve is in its neutral position, a cam associated with the main valve arranged to open the check valve when the main valve is in either its "lower" position or its "float" position, and means on the main valve arranged to close the "lower" port when the main valve is in its neutral position.

PAUL C. TEMPLE.